UNITED STATES PATENT OFFICE.

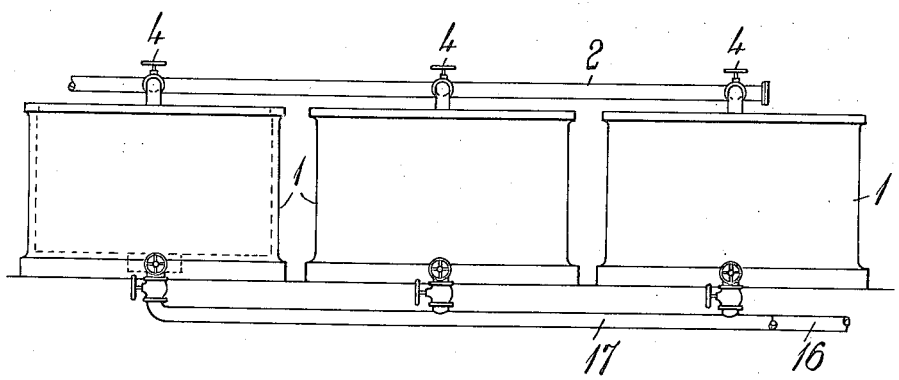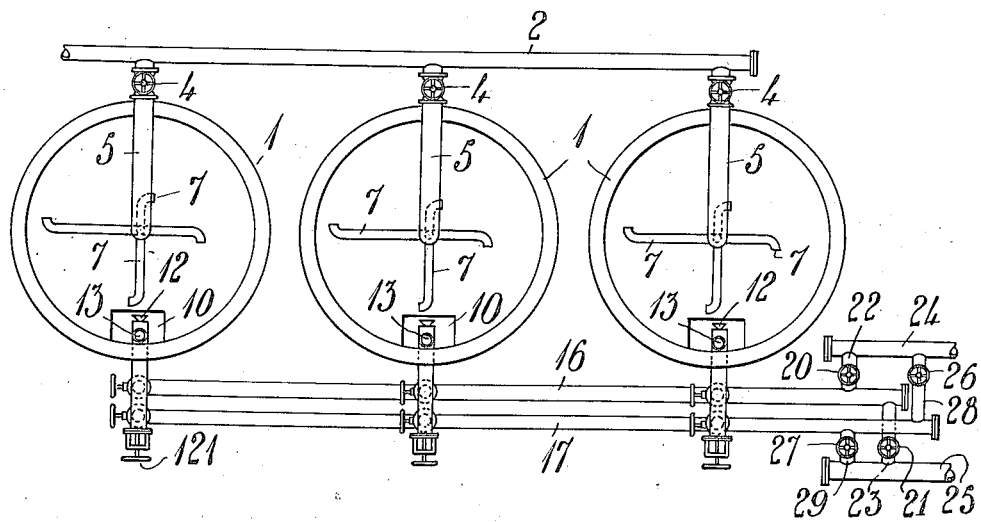

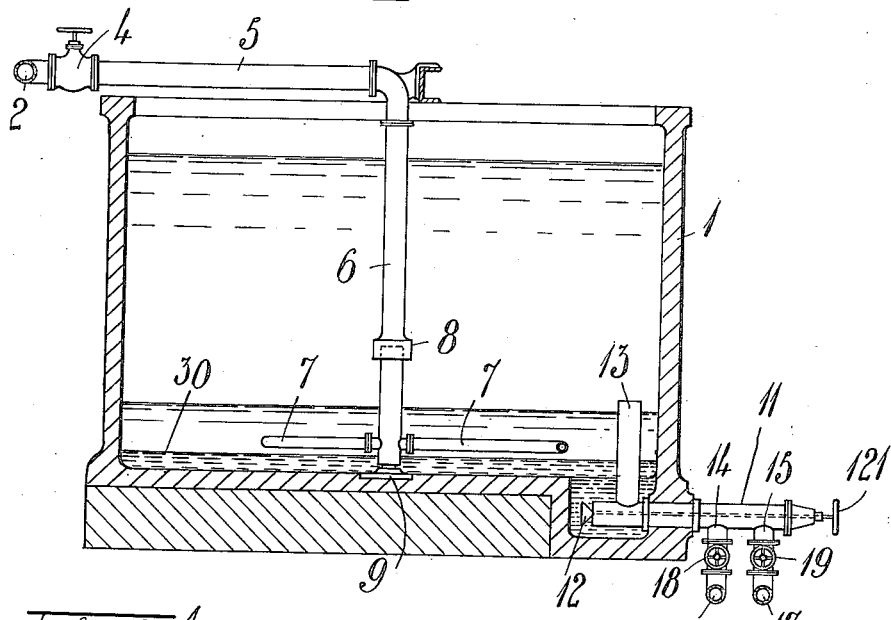
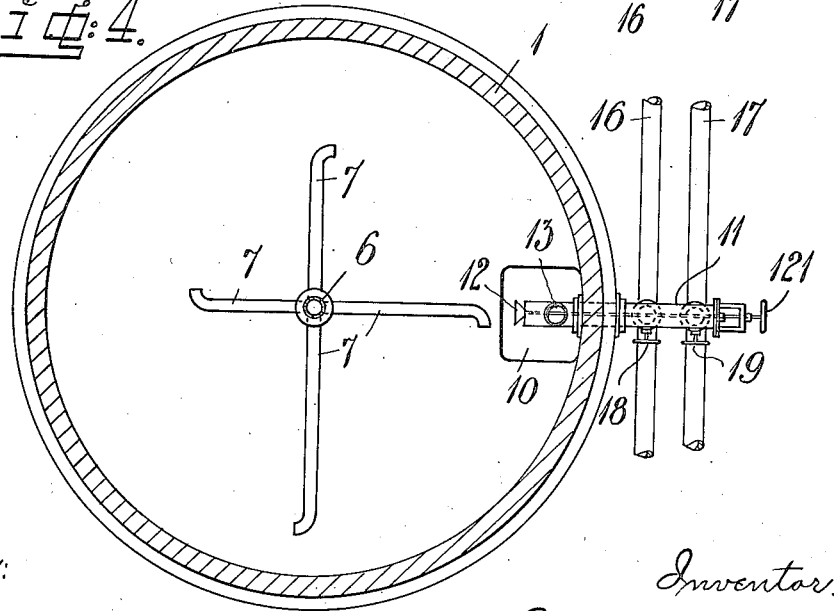

PER GÖSTA EKSTRÖM, OF HARNÄS, SWEDEN.

APPARATUS FOR FERMENTING SULFITE LIQUOR.

1,139,507.

Specification of Letters Patent. Patented May 18, 1915.

Application filed March 2, 1912. Serial No. 681,227.

*To all whom it may concern:*

Be it known that I, PER GÖSTA EKSTRÖM, a citizen of the Kingdom of Sweden, residing at Harnäs, Sweden, have invented new and useful Improvements in Apparatus for Fermenting Sulfite Liquor, of which the following is a specification.

In fermenting the sulfite liquor from the sulfite pulp process and similar liquids containing only a small percentage of saccharine matters for manufacturing alcohol thereof a continuous fermenting process i. e. a process in which the fermentation of the liquid in a vat is carried out by means of yeast from the preceding fermenting process in said vat or by transferring a part of the liquid from another vat in which the fermenting process even is going on, must be used for gaining a good economical result. Furthermore, it is necessary to ferment large quantities of liquor in each charge which requires fermenting vats holding about 100 cu. m. or more and having a bottom area of about 20–30 sq. m. In using vats of such dimensions there arise difficulties in obtaining a satisfactory mixing of the liquid to be fermented and the yeast, inasmuch as the mixing and stirring apparatus usually used in the alcohol manufacture cannot suitably be employed because all expensive apparatus and operations must be avoided, the process being otherwise economically impossible.

This invention relates to an apparatus which serves to carry into effect the process of fermenting saccharine liquids described and claimed in my application Serial No. 681,226, filed March 2, 1912, and by means of which I am able to carry out the fermentation of large quantities of sulfite liquor in a cheap and inexpensive manner.

The invention consists, chiefly, in a fermentation vat having means for discharging the fermented liquid from a point above the bottom of the vat, means for discharging the yeast resting on the bottom of the vat after the discharge of the fermented liquid, and means for supplying the liquid to be fermented near to the bottom of the vat so as to intimately mix itself with yeast remaining in the vat from the foregoing fermentation operation.

I will herebelow more fully describe my invention when applied to vats for fermenting the sulfite liquor from the sulfite pulp process while referring to the accompanying drawings which show a constructional form of the invention.

Figure 1 shows a front elevation of a battery of three vats with supply and drawing off pipes. Fig. 2 is a plan view thereof. Fig. 3 shows a vertical section of the vat on a larger scale and Fig. 4 is a horizontal section thereof.

Referring to the drawings, 1 designates the vats in which the fermenting process is carried out and which are preferably made of concrete. The number of vats of course may be arbitrary and for the sake of simplicity I have shown only three such vats.

2 is a pipe for admitting the liquor to the vats being connected to the vats 1 by branch pipes 5 each having a valve 4.

The supply pipe is suitably disposed at the top of the vats and each branch pipe consists of a horizontal portion 5 and a vertical portion 6, the latter being extended toward the bottom of the vat. Closely above the bottom the pipe 6 is provided with a number of radial distributing pipes 7, which suitably are of different lengths the ends being bent sidewise so that the liquid will flow into the vat in a substantially tangential direction. The distributing pipes 7 and the vertical pipe 6 or the lower portion of the latter may be journaled rotatably. In Fig. 3 I have indicated such an arrangement wherein the pipe 6 is divided at the cap 8 and has its lower end resting in a bearing 9.

The drawing off device of the vats is constructed in the following manner: A horizontal drawing off pipe 11 passes through the side-wall of the vat closely to the bottom in which suitably is made a recess 10 in which the said pipe rests. In the vat the said pipe has a valve 12, which may be closed and opened by means of a hand wheel 121 outside the vat, and a vertical branch pipe 13, extending with its upper open end above the layer of yeast which after the completion of the fermentation rests on the bottom of the vat. The drawing off pipe 11 is outside the vat provided with two branch pipes 14 and 15, which are connected to a discharge pipe 16 and 17 respectively and have valves 18 and 19 respectively. The discharge pipe 16 is by means of branch pipes 22 and 23 having valves 20 and 21 respectively connected to pipes 24 and 25 respectively, of which the pipe 24 leads to a receptacle (not shown in the drawing) for collecting the yeast drawn off from the bottom of the vat while the pipe 25 leads to a reservoir (not shown), for storing up the fermented liquor before it is led to the distilling apparatus. The discharge pipe 17 is in similar manner by means of branch pipes 28 and 29 having valves 26 and 27 respectively connected to the same pipes 24 and 25 respectively. By this arrangement of the drawing off pipes it is possible to discharge the chief part of the liquor and the bottom yeast through any of the pipes 16 and 17, thereby saving time when a greater number of vats are used which are discharged at different times.

In short, the present process of fermentation consists in this that a layer of healthy yeast cells floating on the surface of the fermented sulfite liquor is used for starting the fermentation of the succeeding quantities of sulfite liquor, the exhausted yeast cells, at the bottom of the fermenting vat, having been drawn off. Said process is carried out in the above described apparatus in the following manner: When a fermentation process has been completed in a vat the old yeast sinks to the bottom, while the healthy yeast, on account of its less specific weight, is kept suspended in the liquor and successively rises to the surface of the liquid. In discharging the vat I first open for instance the valves 18 and 21 while the other valves remain closed. The clear fermented liquor then runs off through the branch pipe 13 and the pipes 11, 16 and 25 to the storing reservoir. When the clear liquor has been drawn off, the vat contains a quantity of old yeast resting on the bottom of the vat, and a quantity of liquid indicated by the level 31, Fig. 3, in which the healthy yeast is kept suspended. Now the valves 18 and 21 are closed and the valves 12, 19 and 20 opened whereupon the chief part of the bottom layer of the yeast runs off through the pipes 11, 17 and 24 to the receptacle serving for storing the same and afterward may be used for preparing a yeast-food. When the said part of the bottom layer of the yeast has been drawn off, the valves 12, 19 and 26 are closed. The vat now contains only a layer of healthy yeast which is used for the next fermentation in said vat. A new charge of sulfite liquor is now admitted to the vat by opening the valve 4, the liquor flowing into the vat near to the bottom through the distributing pipes 7 and whirling up the yeast stored on the bottom of the vat and mixing thoroughly therewith. The mixing of the liquor with yeast is expedited on account of the arrangement of the distributing pipes 7 shown in the drawings which causes a rotary motion of the liquor and the yeast. If the distributing pipes are rotatable as indicated in the drawings they will rotate in opposite direction to the liquor on account of the reaction caused by the outflowing liquor and act as stirrers and also in this manner facilitate the mixing of the liquor with the yeast. When the vat has been charged with liquor and the fermentation has begun the yeast is held suspended in the liquor by means of the carbonic dioxid developed during the fermentation. When the fermentation has been completed the yeast sinks to the bottom and the discharge of the vat takes place as described above.

When a number of fermentation processes has been carried out in the above described manner in a vat, the whole quantity of yeast becomes less healthy. I then draw off the whole quantity of yeast remaining after the discharge of the fermented liquor and transfer a suitable quantity of liquor from another vat wherein the fermentation has even begun and the yeast of which is fully healthy. In this manner a healthy yeast is maintained in the apparatus and it is only necessary to add to the liquor suitable quantities of yeast-food which further the growth of the yeast.

Having now described my invention, what I claim as new and desire to secure by Letters Patent is:

Apparatus for fermenting sulfite liquors and the like which comprises, a vat, a pipe for supplying sulfite liquor centrally of the vat, a rotatable extension on the end of said pipe having substantially horizontal sulfite liquor discharging arms of different lengths rotatable adjacent the bottom of said vat, whose ends are bent to direct the discharging liquor tangentially, means to draw off the liquor from the vat, comprising a straight draw-off pipe below the spent yeast level, a valve to close the inner end of said pipe, and an open-ended pipe extending upwardly from the draw-off pipe, above the healthy yeast level, and two valved discharge pipes connected to the draw-off pipe whereby either fermented liquor or spent yeast may be discharged through either discharge pipe.

In testimony whereof I have signed my name in presence of two subscribing witnesses.

PER GÖSTA EKSTRÖM.

Witnesses:
 CARL DELMAR,
 JOHN DELMAR.